US008275853B2

(12) United States Patent
Almeida et al.

(10) Patent No.: US 8,275,853 B2
(45) Date of Patent: Sep. 25, 2012

(54) METHOD AND SYSTEM FOR A SERVICE INTERMEDIARY SELECTION IN A WEB SERVICE MANAGEMENT SYSTEM

(75) Inventors: Kiran Joseph Almeida, Karnataka (IN); Veera Raghava Reddy, Karnataka (IN); Birur Keshavarao Sudhanva Bhandolkar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 137 days.

(21) Appl. No.: 12/403,387

(22) Filed: Mar. 13, 2009

(65) Prior Publication Data

US 2010/0191796 A1   Jul. 29, 2010

(30) Foreign Application Priority Data

Jan. 29, 2009   (IN) .............................. 199/CHE/2009

(51) Int. Cl.
*G06F 15/173* (2006.01)
(52) U.S. Cl. ........ 709/217; 709/203; 709/223; 709/224; 709/238; 709/239

(58) Field of Classification Search .................. 709/203, 709/217, 223, 224, 238, 239
See application file for complete search history.

(56) References Cited

U.S. PATENT DOCUMENTS

| | | | |
|---|---|---|---|
| 6,374,297 B1 * | 4/2002 | Wolf et al. | 709/226 |
| 6,779,017 B1 * | 8/2004 | Lamberton et al. | 709/203 |
| 7,155,722 B1 * | 12/2006 | Hilla et al. | 718/105 |
| 7,185,096 B2 * | 2/2007 | Kalyanavarathan et al. | 709/226 |
| 7,356,592 B2 * | 4/2008 | Wolf et al. | 709/226 |
| 7,523,181 B2 * | 4/2009 | Swildens et al. | 709/223 |
| 7,640,023 B2 * | 12/2009 | Ma et al. | 455/453 |
| 7,640,258 B2 * | 12/2009 | Garcea et al. | 1/1 |
| 7,676,576 B1 * | 3/2010 | Kommula | 709/226 |
| 7,792,948 B2 * | 9/2010 | Zhao et al. | 709/224 |
| 7,865,594 B1 * | 1/2011 | Baumback et al. | 709/224 |
| 2007/0106520 A1 * | 5/2007 | Akkiraju et al. | 705/1 |

* cited by examiner

*Primary Examiner* — Yasin Barqadle
*Assistant Examiner* — Van Kim T Nguyen

(57) ABSTRACT

Presented is a method and system for a service intermediary selection in a web service management system. The method comprises: receiving a service request by the web service management system; and selecting the service intermediary from a plurality of service intermediaries by a planning module of the web service management system.

9 Claims, 5 Drawing Sheets

METHOD AND SYSTEM FOR A SERVICE INTERMEDIARY SELECTION IN A WEB SERVICE MANAGEMENT SYSTEM

RELATED APPLICATIONS

Benefit is claimed under 35 U.S.C. 119(a)-(d) to Foreign application Serial No. 199/CHE/2009 entitled "METHOD AND SYSTEM FOR A SERVICE INTERMEDIARY SELECTION IN A WEB SERVICE MANAGEMENT SYSTEM" by Hewlett-Packard Development Company, L.P., filed on 29 Jan. 2009, which is herein incorporated in its entirety by reference for all purposes.

BACKGROUND

Web Services are increasingly becoming a popular example for distributed computing. Having emerged as useful business integration tools at an enterprise level, they provide a flexible and dynamic environment for execution of many business critical applications. Since many enterprises are moving towards service oriented architecture (SOA), web services provide a simple yet efficient method of sharing and managing data. However, a service provider needs to address a number of issues like reliability, Quality of Service (QoS) etc, when externalizing the functionality of a web service.

In a web service management system, communication between a service provider and a consumer can be managed in several ways. One way is to use an agent-based approach to implement service management capabilities. The other is to use an intermediary based approach. In the intermediary approach, an intermediary acts as a mediator between a consumer and web services. A web service management system may consist of a group of service intermediaries that manage a set of services. The intermediary receives a service request from the consumer and passes it to a web service. Since the request is routed through a service intermediary, the selection of the service intermediary is a crucial step and must be able to cater to the runtime performance requirements of the consumer.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Web services are based on a service oriented architecture (SOA). An SOA enables a collection of services to be made available and discoverable over the web. In simple terms, it basically helps a service provider offer a set of services to a consumer(s) through a set of tools that may be platform and programming language independent. The web services offered may be proprietary or non-proprietary.

A web service management system essentially supports and brings together two kinds of software entities: service providers and consumers. The service provider creates a web service and publishes it through a service registry over the web. The service registry is discoverable over the web and allows a web service provider to offer any number of web services. A consumer is an entity that searches the service registry to find a service it requires. It then makes a service request to the service provider through the web service management system for invocation of that service.

A set of standards based on Extensible Markup Language (XML) are generally used for the invocation and management of web services. These standards are being formalized by World Web Web Consortium. The interface of a web service is described in a document called the Web Services Description Language (WSDL). The interactions between a consumer and a service provider involve exchanging XML messages and are governed by a standard called the Simple Object Access Protocol (SOAP).

The communication between a service provider and a consumer may take place through a service intermediary. A service intermediary provides necessary support for processing of a request message. A number of services may be managed by a group of intermediaries. On receiving the request message, the intermediary processes the message and routes it to an endpoint for service invocation. On invocation, the response is intercepted, processed and routed to the relevant consumer.

There may be a service contract governing the relationship between a consumer and a service provider. The service contract may have components that address features such as Quality of Service (QoS), security, Service Level Agreement (SLA), semantics, invocation, service operations, etc. In a web service management system that manages a large number of consumers and services, it is important that service intermediaries adhere to the service agreements entered between a consumer and the service provider. This calls for an efficient management of service intermediaries.

Figure 1:
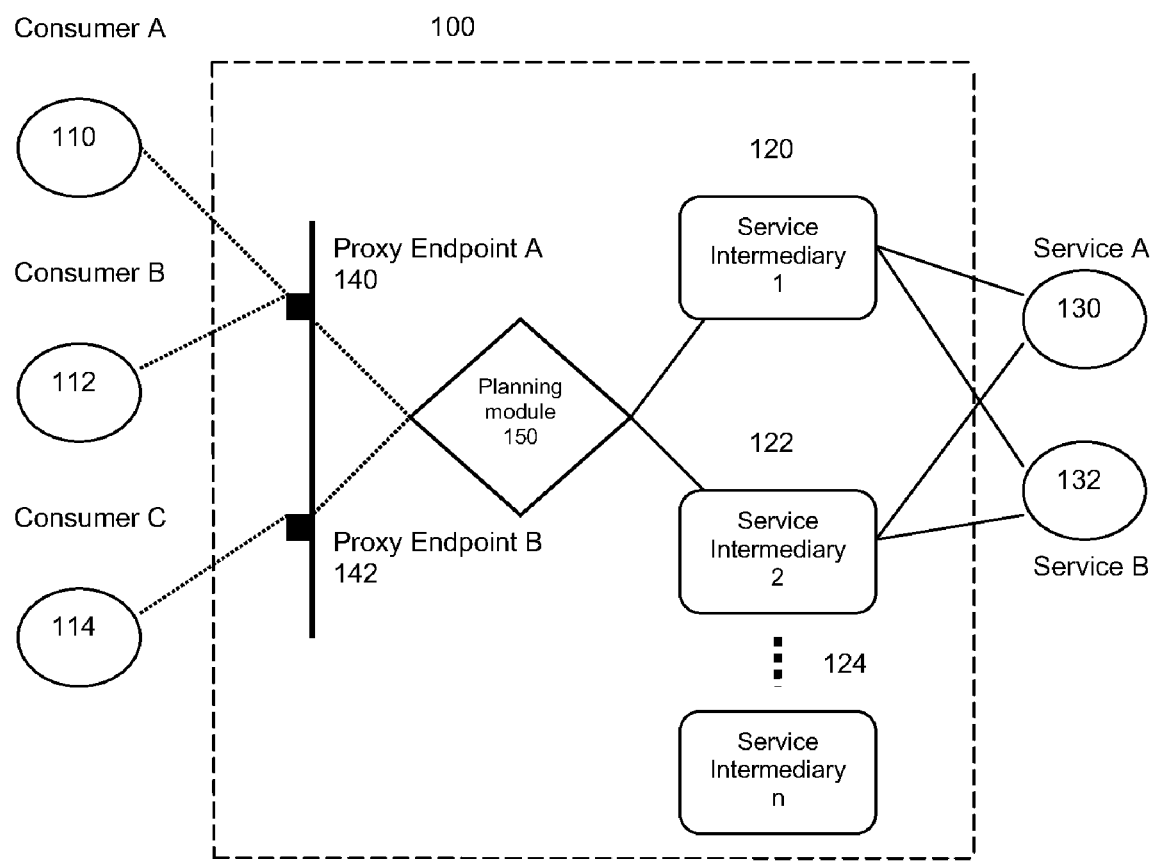
FIG. 1 provides a schematic illustration of an embodiment of a web service management system of the invention.

FIG. 1 provides a conceptual overview of an embodiment of a web service management system 100 of the invention.

The web service management system (100) comprises proxy endpoints (140, 142), a planning module (150) and a number of service intermediaries (120, 122 and 124). In the overview, the web service management system (100) exposes its proxy interface to the outside world for interaction. In the present example, proxy endpoints A and B act as interface between the web service management system (100) and consumer A (110), consumer B (112) and consumer C (114). The service intermediaries reside in the mediation layer of the web service management system (100) and manage a set of services. In this embodiment, service intermediaries (120, 122 and 124) manage a set of services (130, 132). Service intermediaries provide value added services like auditing, security, etc along with runtime governance for the managed services. It would be appreciated that the service intermediaries and the set of services (130, 132) depicted in the present example are for the purpose of illustration only and the number of service intermediaries and web services may vary depending on the web service management system and the services offered.

The planning module (150) is arranged to interact as a mediator between the proxy endpoints and service intermediaries of the web service management system. It functions as a central decision point in the selection of a service intermediary and may include a software program product arranged to implement the method of the present invention, as will be explained in more detail later. The planning module comprises two sub-modules: a consumer identification module and a planner module. Both these modules are illustrated in FIG. 2 and will be described later.

In the present embodiment, to invoke a service A (130), for example, a consumer A (110) makes a service request to the web service management system (100), through its interface proxy endpoint A. The proxy interface forwards the service request to the planning module (150) for selection of an ideal intermediary. Based on consumer's agreement with the service provider on the run time performance requirements, which will be described later in detail, the planning module selects a service intermediary, say, service intermediary 1 (120), in the present example. The service intermediary 1 forwards the service request to service A, for invocation.

Figure 2:
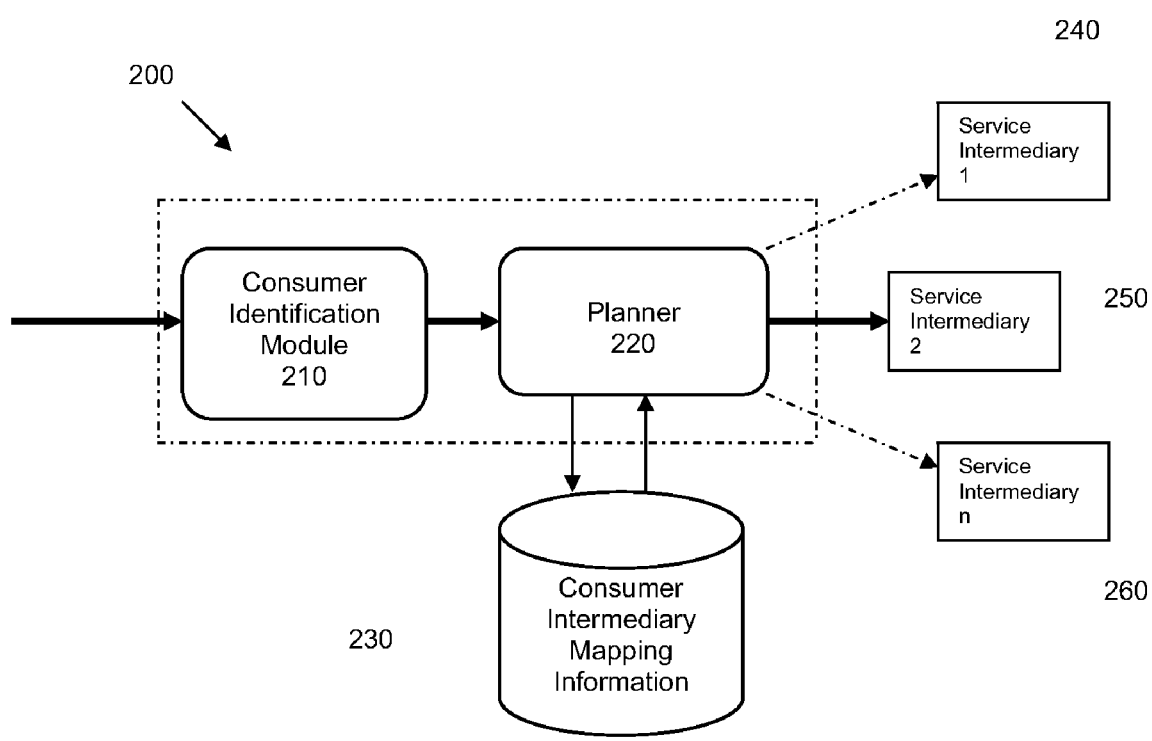
FIG. 2 is a schematic illustration of an embodiment of a module of the web service management system of FIG. 1.

FIG. 2 shows a schematic illustration of an embodiment of a module of the web service management system. In the present example, it provides a conceptual overview of the planning module (150) of web service management system (100). In the overview, the planning module comprises a consumer identification module (210) and a planner (220).

The consumer identification module is entrusted with the task of identifying a service request. In this example, whenever a consumer makes a service request through a proxy endpoint of the web service management system, the request is identified by the consumer identification module (210).

The planner is arranged to interact with the consumer identification module (210), a consumer intermediary mapping information database (230) and a plurality of service intermediaries (240, 250 and 260) of the web service management system. It comprises of sub-modules: a continuous planner, a metrics aggregator, an ontology adaptor, a reasoner and a knowledge base. These modules are illustrated in FIG. 3 and will be described in detail later.

In this embodiment, upon identification, the consumer identification module (210) forwards the service request to the planner (220) for further processing. The planner, on its part, selects the ideal intermediary from the plurality of service intermediaries (240, 250 and 260) based on the information contained in the consumer intermediary mapping information database. Once the request is dispatched to the endpoint for service invocation, the corresponding runtime performance parameters of the intermediary get affected. These parameters are updated in the consumer intermediary mapping information database to reflect the latest changes. Therefore, after sending out a service request, the planner updates the consumer intermediary mapping information database. The selection of an intermediary is based on various runtime performance parameters agreed upon between a consumer and a service provider.

Figure 3:
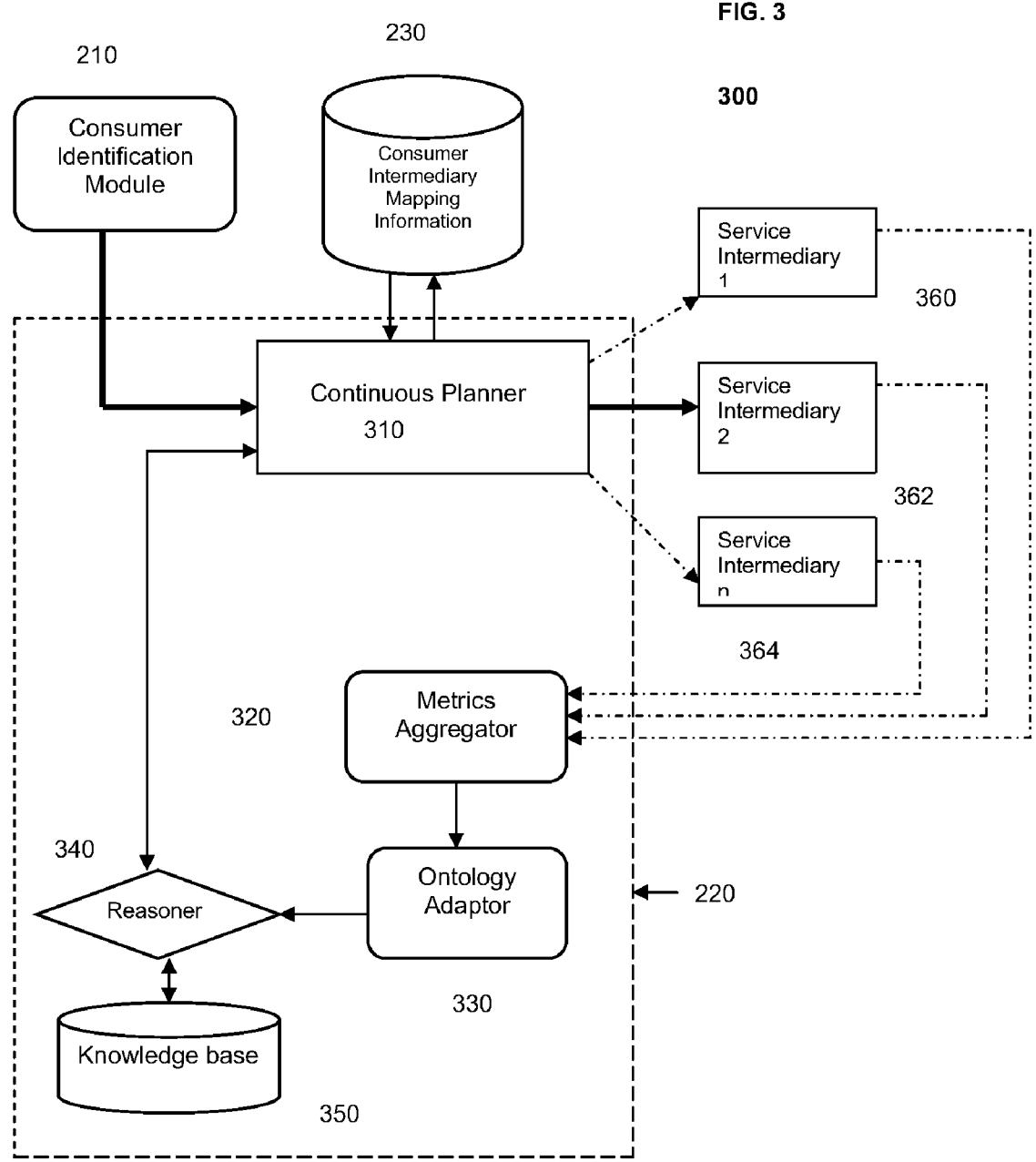
FIG. 3 is a schematic illustration of an embodiment of a sub-module of the module of FIG. 2.

FIG. 3 is a schematic illustration of an embodiment of a sub-module of the module of FIG. 2. In the present example, it provides a conceptual overview of the planner (220) of the planning module (150). In the overview, the planner comprises a continuous planner (310), a metrics aggregator (320), an ontology adaptor (330), a reasoner (340) and a knowledge base (350).

The continuous planner (310) is the sub-module of the planner module that is arranged to interact with the consumer identification module (210), a consumer intermediary mapping information database (230) and a plurality of service intermediaries (360, 362 and 364) of the web service management system. The continuous planner selects the ideal intermediary based on the information contained in the consumer intermediary mapping information database. It is primarily responsible for continuously evolving new strategy to identify a service intermediary that can satisfy the requirements of a consumer in a constantly changing environment.

The metrics aggregator (320) is a sub-module that is responsible for aggregating performance metrics of the service intermediaries.

The ontology adaptor (330) is responsible for converting the metrics information into an ontological representation. Ontology symbolizes a means of knowledge representation. It represents information in a machine readable format. A consumer can have several runtime performance requirements under which a service provider is expected to perform, for instance maximum response time, average response time, uptime etc. Among the various performance requirements, there could be some performance parameters that must be met and others that should ideally be met. Ontologies define concepts and relationships between the concepts in a machine readable format. The ontology adaptor utilizes this association to model the requirements of the consumer in an ontological format, thus enabling the planning module to select an ideal intermediary from a list of probable based on the various performance parameters that each intermediary currently provides.

The reasoner (340) is responsible for executing ontological reasoning on the ontological data generated by the ontology adaptor and generates conclusions based on logical deductions.

The knowledge base (350) serves as a repository for the ontology definitions used within the system. It also serves as a repository for the agreement between the service provider and the consumers; this information forms the basis of the consumer intermediary mapping information database.

In this embodiment, upon identification, the consumer identification module (210) forwards the service request to the continuous planner (310) for further processing. The continuous planner, on its part, selects the ideal intermediary from the plurality of service intermediaries (360, 362 and 364) based on the information contained in the consumer intermediary mapping information database. Once the request is dispatched to the endpoint for service invocation, the corresponding runtime performance parameters of the intermediary get affected. These parameters are aggregated by the metrics aggregator (320), which forwards them to the ontology adaptor (330). The ontology adaptor converts the metrics information into an ontological representation. The reasoner (340) executes ontological reasoning on the ontological data generated by the ontology adaptor and generates conclusions based on logical deductions. These results along with the run time performance parameters are updated in the consumer intermediary mapping information database to reflect the latest changes. The selection of an intermediary is based on various runtime performance parameters agreed upon between a consumer and a service provider.

Figure 4:
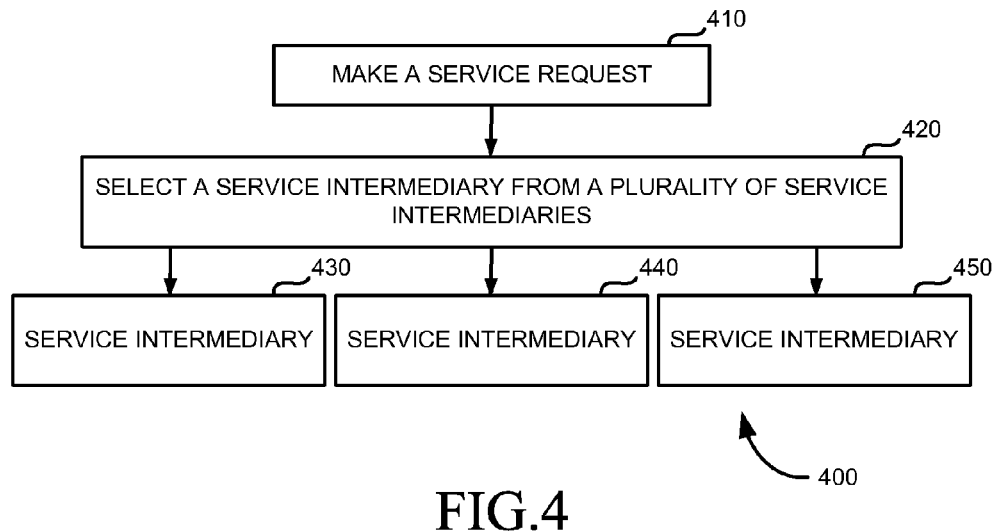
FIG. 4 is a flow diagram of a method according to an embodiment of the invention.

FIG. 4 is a flow diagram of a method 400 according to an embodiment of the invention.

At step 410, a service request is made to a web service management system. As depicted in FIG. 1, a consumer or a number of consumers may simultaneously make a service request to the web service management system. A proxy endpoint acts as a contact point for a consumer to make a service request. Upon receiving a service request, the web service management system forwards the request to its planning module.

At step 420, the planning module selects a service intermediary from a plurality of service intermediaries (430, 440 and 450).

Figure 5:
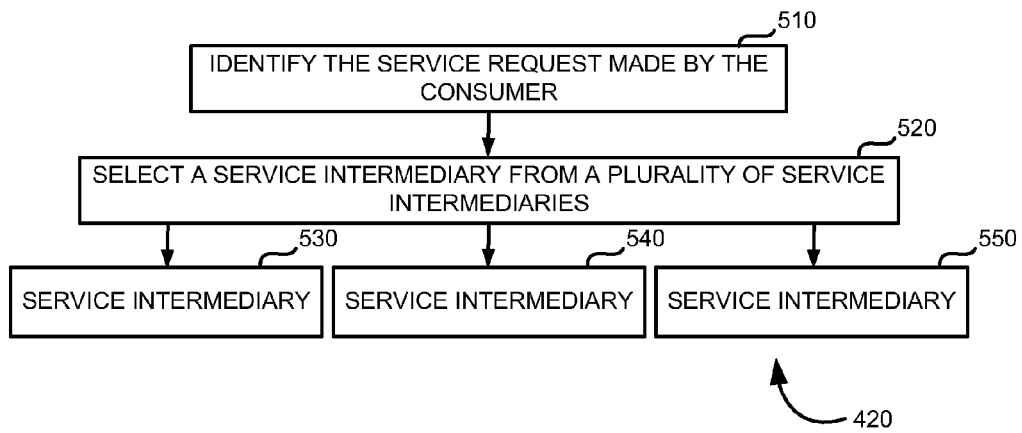
FIG. 5 is a flow diagram illustrating an embodiment of a method step of FIG. 4.

Referring now to FIG. 5, method undertaken in step 420 will be described.

At step 510, a consumer identification module, which is a sub-module of the planning module, identifies the service request made by the consumer. Once the consumer identification module identifies the consumer, the service request is forwarded to a planner module, which is another sub-module of the planning module.

At step 520, the planner module selects a service intermediary from a plurality of service intermediaries (530, 540 and 550).

Figure 6:
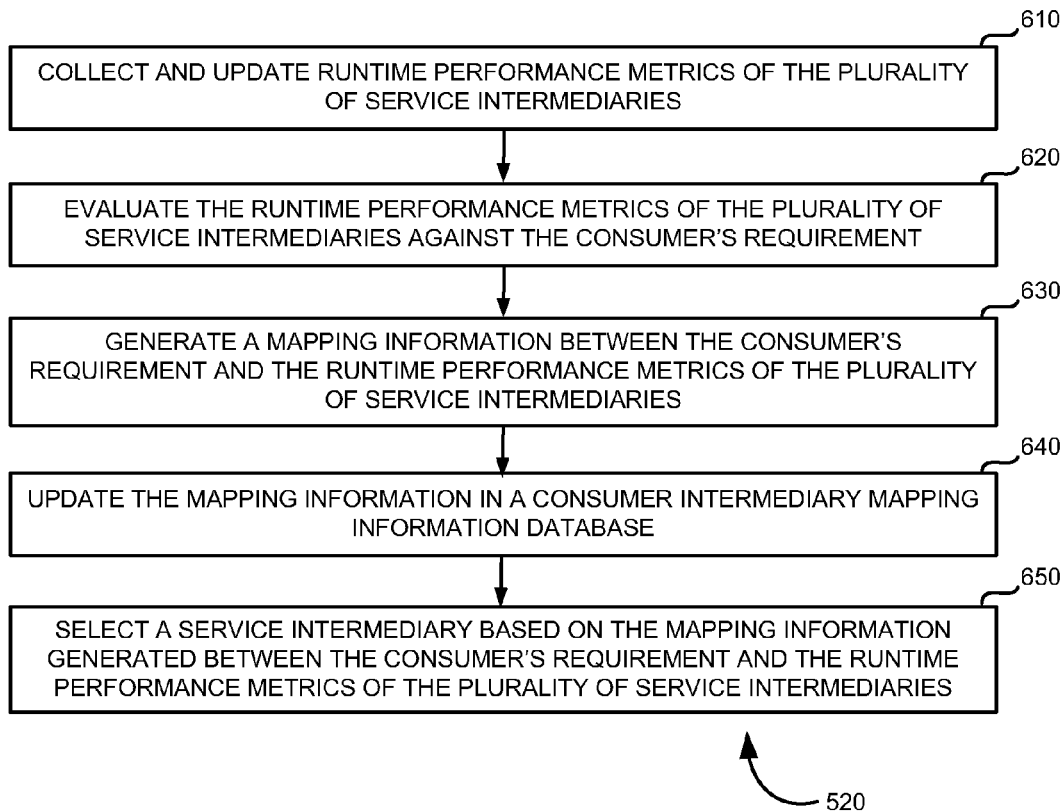
FIG. 6 is a flow diagram illustrating an embodiment of a method step of FIG. 5.

Referring now to FIG. 6, method undertaken in step 520 will be described.

At step 610, a continuous planner module, which is a sub-module of the planner module, collects and updates runtime performance metrics of the plurality of service intermediaries.

At step 620, the runtime performance metrics of the plurality of service intermediaries are evaluated against the consumer's requirement.

At step 630, a mapping information is generated between the consumer's requirement and the runtime performance metrics of the plurality of service intermediaries.

At step 640, the mapping information is updated in a consumer intermediary mapping information database.

At step 650, a service intermediary is selected based on the mapping information generated between the consumer's requirement and the runtime performance metrics of the plurality of service intermediaries.

Figure 7:
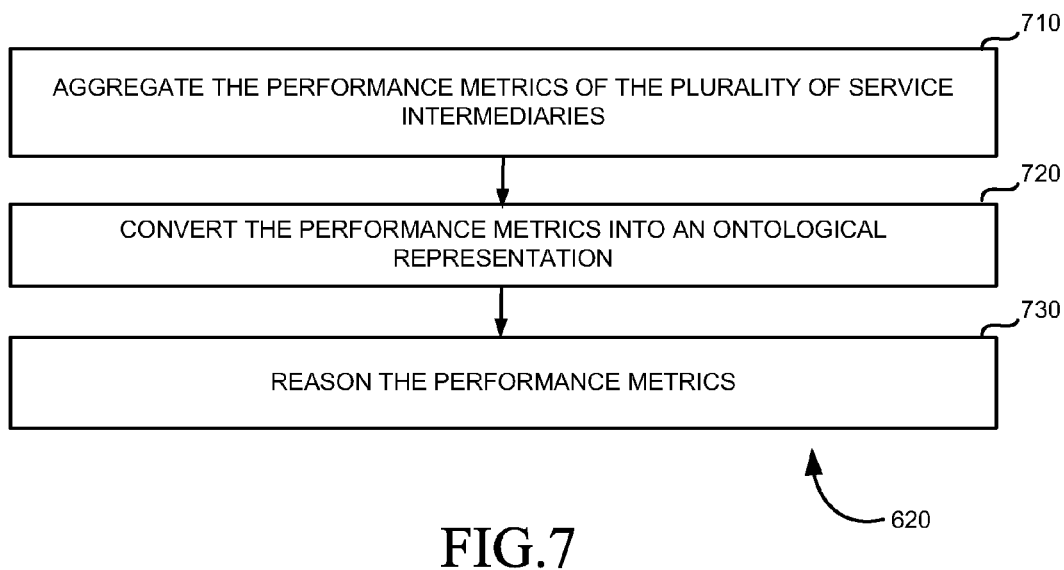
FIG. 7 is a flow diagram illustrating an embodiment of a method step of FIG. 6.

Referring now to FIG. 7, method undertaken in step 620 will be described.

At step 710, the performance metrics of the plurality of service intermediaries are aggregated.

At step 720, the performance metrics are converted into an ontological representation.

At step 730, the performance metrics are reasoned upon.

The collection of performance metrics of the plurality of service intermediaries, aggregating the performance metrics, and updating of the mapping information is carried out autonomously independent of the service request identification and routing mechanism. Further, the ontological representation includes the consumer's requirements in an ontological format.

The runtime performance metrics of the plurality of service intermediaries are updated once the request is dispatched to a service for invocation. The runtime performance metrics of the service intermediary are based on the consumer's requirements and may include metrics, such as, but not limited to, maximum response time, average response time and uptime.

The consumer intermediary mapping information database is constantly updated by the continuous planner and the update is modeled along the metrics baselining mechanism. This is done to prevent further requests from being mediated through a sub optimal intermediary.

Some of the advantages provided by the above described embodiments for selection of an intermediary may be summarized as follows:

The embodiment described provides an adaptive mechanism of selecting a service intermediary that can address the runtime performance requirements of the consumer. The intermediary selection is based on consumer priority. The embodiment provides a flexible approach to deal with the varying load on the service intermediaries.

The embodiment overcomes limitations of static configuration of service mediation and provides better mechanism to deal with service intermediary failure.

The embodiment described is more efficient than the alerting mechanism currently in use in the web service management systems, the solution immediately identifies system intermediary failure and updates the list of service intermediaries participating in service. This reduces the impact of failure detection and correction.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A method for selecting a service intermediary in a web service management system, the method being implemented on at least one computer, comprising:

receiving, by a web service management system, a service request from a consumer selecting, by a planning module, a service intermediary from a plurality of service intermediaries, the selected service intermediary to forward the service request to a service provider, wherein selecting the service intermediary comprises:

collecting and updating runtime performance metrics of the plurality of service intermediaries once the service request is dispatched to a service for invocation;

evaluating the runtime performance metrics of the plurality of service intermediaries against a requirement of the consumer;

generating mapping information between the consumer's requirement and the runtime performance metrics of the plurality of service intermediaries, wherein generating the mapping information comprises:

aggregating the performance metrics by a metrics aggregator;

converting, by an ontology adaptor, the aggregated performance metrics into an ontological representation using a knowledge base that serves as a repository for ontological definitions, wherein the ontological representation includes the consumer's requirement in an ontological format; and executing ontological reasoning, by a reasoner, on the ontological representation of the aggregated performance metrics to generate the mapping information;

updating the mapping information in a consumer intermediary mapping information database; and selecting the service intermediary based on the mapping information generated between the consumer's requirement and the runtime performance metrics of the plurality of service intermediaries agreed upon between the consumer and the service provider.

2. A method according to claim 1, wherein selecting the service intermediary by the planning module comprises:
identifying the service request by a consumer identification module of the planning module; and
selecting the service intermediary by a planner module of the planning module.

3. A method according to claim 1, wherein collecting the performance metrics of the plurality of service intermediaries, aggregating the performance metrics, and updating of the mapping information is carried out autonomously independent of the service request identification and routing mechanism.

4. A method according to claim 1, wherein the runtime performance metrics of the service intermediary are based on the consumer's requirements.

5. A method according to claim 4, wherein the runtime performance metrics of the service intermediary include maximum response time, average response time and uptime.

6. A web service management system comprising:
at least one computer;
non-transitory computer-readable media having computer-executable instructions stored thereon, which when executed by the at least one computer, cause the at least one computer to select a service intermediary, the web service management system further comprising:
at least one proxy end point to receive a service request from a consumer; and
a planning module to select the service intermediary from a plurality of service intermediaries, the selected service intermediary to forward the service request to a service provider, the planning module to:
collect and updating runtime performance metrics of the plurality of service intermediaries once the service request is dispatched to a service provider for invocation;
evaluate the runtime performance metrics of the plurality of service intermediaries against consumer's requirement;
generate mapping information between the consumer's requirement and the runtime performance metrics of the plurality of service intermediaries, wherein the planning module comprises:
a metrics aggregator to aggregate the performance metrics;
an ontology adaptor to convert the aggregated performance metrics into ontological representation using a knowledge base that serves as a repository for ontological definitions, wherein the ontological representation includes the consumer's requirement in an ontological format; and a reasoner to execute ontological reasoning on the ontological representation of the aggregated performance metrics to generate the mapping information;
update the mapping information in a consumer intermediary mapping information database; and
select the service intermediary based on the mapping information generated between the consumer's requirement and the runtime performance metrics of the plurality of service intermediaries agreed upon between the consumer and the service provider.

7. A web service management system according to claim 6, wherein the planning module comprises:
a consumer identification module to identify the service request; and
a planner module to select the service intermediary, wherein the planner module includes the metrics aggregator, the ontology adaptor, and the reasoner.

8. A web service management system according to claim 7, wherein the planner comprises:
a continuous planner module to update the runtime performance metrics of the plurality of service intermediaries.

9. A non-transitory computer readable storage medium having computer-executable instructions which when executed by a computer, cause the computer to:
receive a service request from a consumer; and
select a service intermediary from a plurality of service intermediaries, the service intermediary to forward the service request to a service provider, wherein to select the service intermediary, the computer:
collects and updating runtime performance metrics of the plurality of service intermediaries once the service request is dispatched to a service for invocation;
evaluates the runtime performance metrics of the plurality of service intermediaries against the consumer's requirement;
generates mapping information between the consumer's requirement and the runtime performance metrics of the plurality of service intermediaries, wherein to generate the mapping information, the computer:
aggregates the performance metrics by a metrics aggregator;
converts, by an ontology adaptor, the aggregated performance metrics into an ontological representation using a knowledge base that serves as a repository for ontological definitions, wherein the ontological representation includes the consumer's requirement in an ontological format; and
executes ontological reasoning on the ontological representation of the aggregated performance metrics to generate the mapping information;
updates the mapping information in a consumer intermediary mapping information database; and
selects the service intermediary based on the mapping information generated between the consumer's requirement and the runtime performance metrics of the plurality of service intermediaries agreed upon between the consumer and the service provider.

* * * * *